No. 653,448. Patented July 10, 1900.
J. D. GOULD.
REEL OR SPOOL FOR ELECTRIC THERMOSTATIC CABLES.
(Application filed July 10, 1899.)
(No Model.)
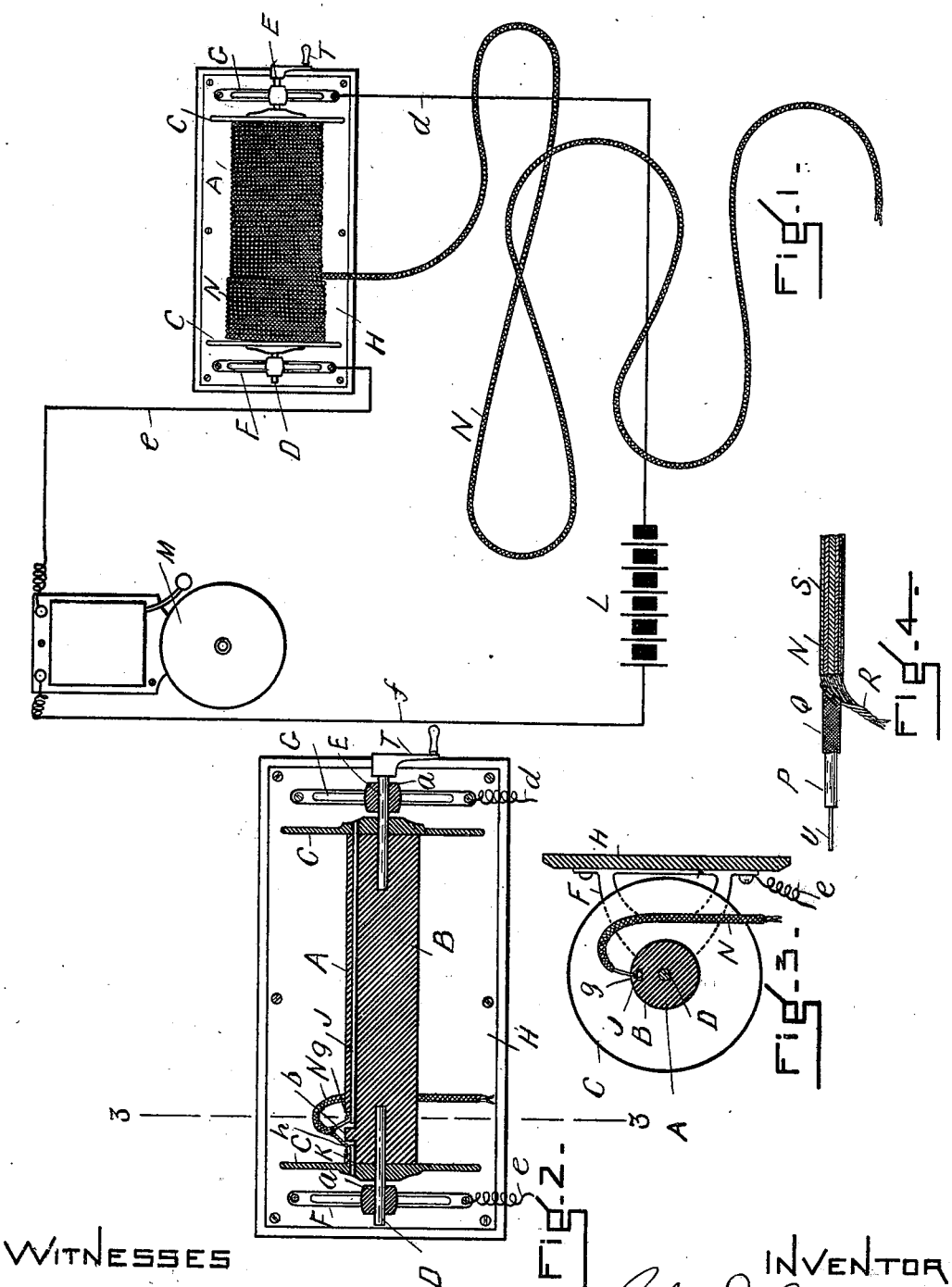
WITNESSES
Howard T. Marshall
John A. Roche
INVENTOR
John D. Gould.
Per Edwin W. Brown.
Attorney.

UNITED STATES PATENT OFFICE.

JOHN D. GOULD, OF NEW YORK, N. Y.

REEL OR SPOOL FOR ELECTRIC THERMOSTATIC CABLES.

SPECIFICATION forming part of Letters Patent No. 653,448, dated July 10, 1900.

Application filed July 10, 1899. Serial No. 723,409. (No model.)

*To all whom it may concern:*

Be it known that I, JOHN D. GOULD, of New York, in the county of New York and State of New York, have invented certain new and useful Improvements in Reels or Spools for Electric Thermostatic Cables, of which the following is a full, clear, and exact description.

This invention relates to a reel or spool suitably constructed and arranged to be in electric connection with an electric battery and an alarm and having wound thereon more particularly an electric thermostatic cable of peculiar construction for the detection of fire, a similar cable and its manner of operation being described and shown in Letters Patent of the United States dated August 4, 1896, and numbered, respectively, as follows: 565,168, 565,178, and 565,217. The present invention consists of a reel or spool constructed and arranged to be in electric connection with an electric battery and an alarm and adapted to have an electric thermostatic cable wound thereon and to be unwound therefrom as desired, the electric connection being maintained at all times through the cable with the spool and battery, whether the cable is partially or fully wound on the spool or being wound thereon or being wound therefrom, the electric circuit, however, being broken or open in the cable and spool, all substantially as hereinafter fully described, reference being had to the accompanying sheet of drawings, in which is illustrated a reel or spool constructed and arranged for operation in accordance with this invention.

Figure 1 represents in front view the reel or spool having wound thereon the electric thermostatic cable with a portion of it unwound and disposed around, the spool being in electric connection with an electric battery and bell-alarm. Fig. 2 is a longitudinal central section of the spool, showing the electric connection and the manner of connecting the electric cable thereto. Fig. 3 is a cross-section on line 3 3, Fig. 2. Fig. 4 is a detail view showing the construction of the electric thermostatic cable.

In the drawings, A represents a spool or reel consisting of a barrel B, flanges or heads C, and journal-pins D E to turn in bearings *a*, respectively in brackets F G, secured to a board or support H for the attachment of the whole to the wall of the room or building or other suitable place.

The spool-barrel is preferably made of wood, or any material that is a non-conductor of electricity will answer; but its heads and journal-pins and the brackets are of metal.

Extending through one head C into the barrel longitudinally nearly its length is a wire J, and passing through the other head C is another shorter wire K, which enters the barrel a short distance in line with wire J, but does not meet or come in contact with it, leaving a part *b* of the material of the spindle between them, all as shown in Fig. 2 more particularly. From the metal bracket G runs an electric wire *d* to one pole of the electric battery L, and from the other bracket F an electric wire *e* connects with an electric bell M, and from the electric bell a wire *f* runs to the other pole of the electric battery, making the electric circuit through the brackets, journal-pins, spool-heads, and wires J K in the barrel, except that the circuit is open at *b* in the barrel between the two wires J K for the operation of the cable in the detection of fire.

The electric thermostatic cable to be used with this spool is shown in detail side view in Fig. 4, N being the cable, and as described and shown in said patents is composed, substantially, of a central wire P of fusible material, covered with an insulated material Q, one or more fine wires R, preferably of copper, wound spirally over and around the insulated material Q and having an outer covering of insulated material S. The fusible wire has a central wire U of copper to give better conductivity to the fusible wire. In attaching the electric cable to the spool the fusible wire P is secured to the wire J at *g*, and the other wires R, which are bunched or twisted together as one, are attached to the other wire K at *h* of the barrel of the spool. In the electric cable there are practically only two wires—the fusible wire and the electric wires between the two insulated materials—as explained in the patents referred to, the series of wires being used instead of only one wire to insure that electric contact will be made by the fusible wire as it expands or melts. The series of wires when attached are twisted together at the ends to make electric connection with the spool-wire K. The two wires P R of the electric cable being insulated from each other, the electric circuit is open, but electric connection is secured through the cable and spool with the battery. The electric cable being attached, as described, is wound upon the spool as desired, as shown in Fig. 1, and the spool secured to a suitable support, so it can be turned easily to unwind or rewind the cable, and for such purpose a handle T is attached to the spool. This reeling of the electric cable is for the purpose of having the electric thermostatic cable in convenient and compact form ready for use at any time for temporarily protecting a room or building or any spot or place or goods, &c., that may be at various times placed in the room or building, especially at night, when such place is left alone.

If goods are placed in a room or building and it is desired to protect them from fire or have an immediate alarm given if a fire should occur near or on the goods, the electric cable is unwound from the spool and freely spread and disposed about, around, and over the goods or about the room near the goods as much as it is desired to fully protect the same at all points. The electric circuit is open in the cable and in the spool, and so long as there is no fire it will remain open, indicating everything is all right, but the instant undue or dangerous heat occurs near to the electric cable which would tend to and might produce a flame or fire immediately the fusible wire of the electric cable is expanded or melted and forced outward through its insulating-material covering into contact with one or more of the outer electric wires R, completing the electric circuit at such place and instantly sounding the bell or alarm, the alarm being located in any place desired.

When not necessary to use the cable as above, it can be wound upon the reel until it is desired to use it to protect the goods from fire.

The manner of making the electric connection through the spool to the battery from the cable can be varied as desired, it only being necessary to so attach the cable to the spool to have the circuit open and yet keep the electric connection intact with the battery at all times whether the cable is wound thereon or unwound therefrom or in the act of winding or unwinding it. Also the construction of the spool can be varied as desired, it being only necessary to make electric connection in some form in the spool for the proper attachment of the electric cable and have the circuit open, as described, and for the spool to be turned to unwind therefrom the electric cable without interfering with the electric connections for the proper working of the cable when the fire occurs. The heads of the spools need not be wholly of metal, as it is only necessary to have sufficient metal to make electric connection between the wires J K and the journal-pins. Also the wires J K in the barrel and the metal heads can be dispensed with by having the journal-pins extend into the barrel sufficiently for their inner ends to come close together without touching or contact and have the electric cable connected to them directly; but the advantage of the wires in the barrel is that they can be near the surface of the barrel, so the cable can be electrically connected much more conveniently and much more easily, can be smaller in diameter, and can be better and the more cheaply applied, as the journal-pins are of quite large diameter. It is preferable to have the two points to which the cable is attached in the spool near together for the more conveniently securing of the cable thereto for the better winding and unwinding of the cable. The cable can be attached to the wires J K of the spool the reverse from the manner described. The spool with the electric cable wound thereon can be conveniently carried from place to place as desired to protect other rooms, &c., in the building, suitable electric connection being made with the battery and alarm which can be located anywhere desired.

Having thus described my invention, what I claim is—

1. In an electric fire-alarm apparatus, a reel or spool comprising a wooden barrel having metal flanges forming heads at the opposite ends of the barrel, journal-pins located in the barrel and projecting from the ends thereof, metal brackets in which the free ends of said pins are journaled, a wire connected at one end to one of the metal heads, extending longitudinally through the body of the barrel and terminating at a point adjacent to the opposite metal head, a second wire connected to the last-named metal head and terminating at a point adjacent to the end of the first-named wire but insulated therefrom, combined with an electric cable arranged to be wound on said spool or reel, said cable being composed of two wires insulated from each other, one of which wires is composed of fusible material, said wires being electrically connected at one end, respectively, to the two separate wires carried by the spool, an electric battery having the poles thereof connected respectively to the two metal brackets in which the spool or reel is journaled, and a bell in the battery-circuit, substantially as described.

2. In an electric fire-alarm apparatus, a reel or spool comprising a wooden barrel having metal flanges forming heads at the opposite ends of the barrel, journal-pins located in the barrel and projecting from the ends thereof, metal brackets in which the free ends of said pins are journaled, a crank-handle on the end of one of said pins by which the barrel may be rotated, a wire connected at one end to one of the metal heads, extending longitudinally through the body of the barrel and terminating at a point adjacent to the opposite metal head, a second wire connected to the last-named metal head and terminating at a point adjacent to the end of the first-named wire but insulated therefrom, combined with an electric cable arranged to be wound on said spool or reel, said cable being composed of two wires insulated from each other, one of which wires is composed of fusible material, said wires being electrically connected at one end, respectively, to the two separate wires carried by the spool, an electric battery having the poles thereof connected, respectively, to the two metal brackets in which the spool or reel is journaled, and a bell in the battery-circuit, substantially as described.

In testimony whereof I have hereunto set my hand in the presence of two subscribing witnesses.

JOHN D. GOULD.

Witnesses:
 EDWIN W. BROWN,
 JOHN A. ROCHE.